(12) United States Patent
Chen et al.

(10) Patent No.: US 12,326,590 B2
(45) Date of Patent: *Jun. 10, 2025

(54) LIGHT GUIDE PLATE, BACKLIGHT MODULE, AND DISPLAY DEVICE

(71) Applicant: Radiant Opto-Electronics Corporation, Kaohsiung (TW)

(72) Inventors: Hao Chen, Kaohsiung (TW); Chin-Ting Weng, Kaohsiung (TW); Chia-Yin Chang, Kaohsiung (TW); Feng-Nien Tsai, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,198

(22) Filed: Jun. 26, 2024

(65) Prior Publication Data

US 2024/0345309 A1    Oct. 17, 2024

Related U.S. Application Data

(63) Continuation of application No. 17/817,658, filed on Aug. 5, 2022, now Pat. No. 12,044,879, which is a continuation of application No. PCT/CN2021/131127, filed on Nov. 17, 2021.

(30) Foreign Application Priority Data

Nov. 19, 2020 (WO) ............... PCT/CN2020/130229

(51) Int. Cl.
*F21V 8/00* (2006.01)

(52) U.S. Cl.
CPC ......... *G02B 6/0055* (2013.01); *G02B 6/0053* (2013.01)

(58) Field of Classification Search
CPC .......................... G02B 6/0055; G02B 6/0053
See application file for complete search history.

(56) References Cited

U.S. PATENT DOCUMENTS

| 2015/0055366 A1* | 2/2015 | Chang | G02B 6/0061 |
| | | | 362/606 |
| 2018/0292598 A1* | 10/2018 | Ke | G02B 6/0053 |
| 2020/0233146 A1* | 7/2020 | Yagi | G02F 1/133528 |

* cited by examiner

*Primary Examiner* — Abdulmajeed Aziz
*Assistant Examiner* — Jessica M Apenteng
(74) *Attorney, Agent, or Firm* — CKC & Partners Co., LLC

(57) ABSTRACT

A light guide plate, a backlight module and a display device are provided. The light guide plate is configured to be coupled to a light source. The light guide plate includes a light-emitting surface, a bottom surface, a light-incident surface, plural stripe-shaped microstructures and plural light guiding microstructures. The bottom surface is opposite to the light-emitting surface. The light-incident surface is connected between the light-emitting surface and the bottom surface. The stripe-shaped microstructures are disposed on the at least one of the light-emitting surface and the bottom surface, and each of the stripe-shaped microstructures has two opposing side surfaces and an active surface. The side surfaces are respectively connected to two opposite sides of the active surface. The light-guiding microstructures are disposed between any adjacent two of the stripe-shaped microstructures and arranged along an extending direction of each of the stripe-shaped microstructures.

10 Claims, 6 Drawing Sheets

LIGHT GUIDE PLATE, BACKLIGHT MODULE, AND DISPLAY DEVICE

RELATED APPLICATIONS

This application is a continuation of U.S. application Ser. No. 17/817,658, filed Aug. 5, 2022 which is a continuation application of International Application No. PCT/CN2021/131127 filed on Nov. 17, 2021 which claims priority to International Application No. PCT/CN2020/130229 filed on Nov. 19, 2020. The entire disclosures of all the above applications are hereby incorporated by reference.

BACKGROUND

Field of Invention

The present disclosure relates to a light-guiding component and its application, and more particularly to a light guide plate, a backlight module, and a display device.

Description of Related Art

A light guide plate has a light-incident surface, a light-emitting surface, and a reflective surface. A light provided by a light source enters the light guide plate through the light-incident surface, and is emitted out from the light-emitting surface. To mix the light passing through an inside of the light guide plate more uniformly, microstructures are usually disposed on the light-emitting surface or the reflective surface.

However, when the light entering the light guide plate is emitted to the microstructures, because the amount of the light reflected or refracted by the normal microstructures is limited, it is not only unable to effectively use the light, but also easily causes optical appearance problems of the light guide plate such as uneven light emission. Therefore, how to improve a structure of the light guide plate to increase the brightness uniformity of a backlight module, and make light emission quality of the backlight module satisfies specifications of different panels has become an effort goal of the relevant industry.

SUMMARY

Accordingly, an objective of the present disclosure is to provide a light guide plate, a backlight module, and a display device to solve the aforementioned problems.

According to the aforementioned objectives of the present disclosure, a light guide plate is provided, and the said light guide plate is configured to be coupled with a light source. The light guide plate includes a light-emitting surface, a bottom surface, a light-incident surface, a plurality of stripe-shaped microstructures, and a plurality of light-guiding microstructures. The bottom surface is opposite to the light-emitting surface. The light-incident surface is connected between the light-emitting surface and the bottom surface, and light emitted by the light source enters the light guide plate through the light-incident surface. The plurality of stripe-shaped microstructures is disposed on at least one of the light-emitting surface and the bottom surface. The plurality of light-guiding microstructures is disposed between any adjacent two of the stripe-shaped microstructures and is arranged along an extending direction of each of the stripe-shaped microstructures. Each of the light-guiding microstructures includes a light-facing surface and an opposite light-facing surface interconnected to each other, and an inclination degree of the light-facing surface is smaller than an inclination degree of the opposite light-facing surface. The light-facing surface includes a first reflective surface and a second reflective surface connected to each other, an inclination degree of the first reflective surface is smaller than an inclination degree of the second reflective surface, and one of the first reflective surface and the second reflective surface is connected to the opposite light-facing surface.

According to one embodiment of the present disclosure, the light guide plate includes an opposite light-incident surface opposite to the light-incident surface. Each of the stripe-shaped microstructures includes a first portion, a second portion, and a third portion, in which the first portion has a first width and is close to the light-incident surface, the second portion has a second width and is close to the opposite light-incident surface, and the third portion is between the first portion and the second portion and has a third width. The third width is larger than the first width, and the first width is larger than the second width.

According to one embodiment of the present disclosure, each of the stripe-shaped microstructures has two opposite side surfaces and an active surface, in which the side surfaces are connected to two opposite sides of the active surface, in which the light guide plate has a thickness direction, the side surfaces are inclined toward the active surface, and there is an included angle formed between each of the side surfaces and the thickness direction.

According to one embodiment of the present disclosure, a distance between edges of the side surfaces of each of the stripe-shaped microstructures not connected to the active surface is larger than a width of the active surface.

According to one embodiment of the present disclosure, the light guide plate has a length direction, the length direction is perpendicular to the light-incident surface, in which each of the light guiding microstructures has a ratio, the ratio is a projection length of the second reflective surface in the length direction divided by a projection length of the first reflective surface in the length direction, and the ratio of the light-guiding microstructure far from the light-incident surface is smaller than the ratio of the light-guiding microstructure adjacent to the light-incident surface.

According to the aforementioned objectives of the present disclosure, a backlight module is provided. The backlight module includes the aforementioned light guide plate and a light source. The light source is adjacent to the light-incident surface.

According to one embodiment of the present disclosure, the backlight module further includes at least one prism sheet disposed on the light guide plate, in which the prism sheet includes a plurality of prism structures, and an extending direction of each of the prism structures is parallel to the light-incident surface.

According to the aforementioned objectives of the present disclosure, a display device is provided. The display device includes the aforementioned backlight module and a display panel. The display panel is disposed on the backlight module.

It can be known from the above that the present disclosure changes the path of light in the light guide plate through the stripe-shaped microstructure having the double side surfaces and the active surface, and adjusts a light-emitting location and a light-emitting amount with the light-guiding microstructures, such that the objective of adjusting a light-emitting view angle and improving an overall light-emitting uniformity can be achieve.

BRIEF DESCRIPTION OF THE DRAWINGS

For a more fully understanding of embodiments and their advantages, reference is now made to the following description taken in conjunction with the accompanying figures, in which.

DETAILED DESCRIPTION

A light guide plate of the present disclosure may be used in a backlight module, and the backlight module may be used as a light source of a display device. Each component in the backlight module includes a bottom surfaces and a top surface, and the definition of the bottom surface and the top surface are based on a display panel of the display device, in which the surface of each component away from the display panel is the bottom surface, and the surface facing the display panel is the top surface. Furthermore, in the present disclosure, a component disposed on another component means that the component is disposed on a top surface of the another component or above the top surface of the another component.

Figure 1:
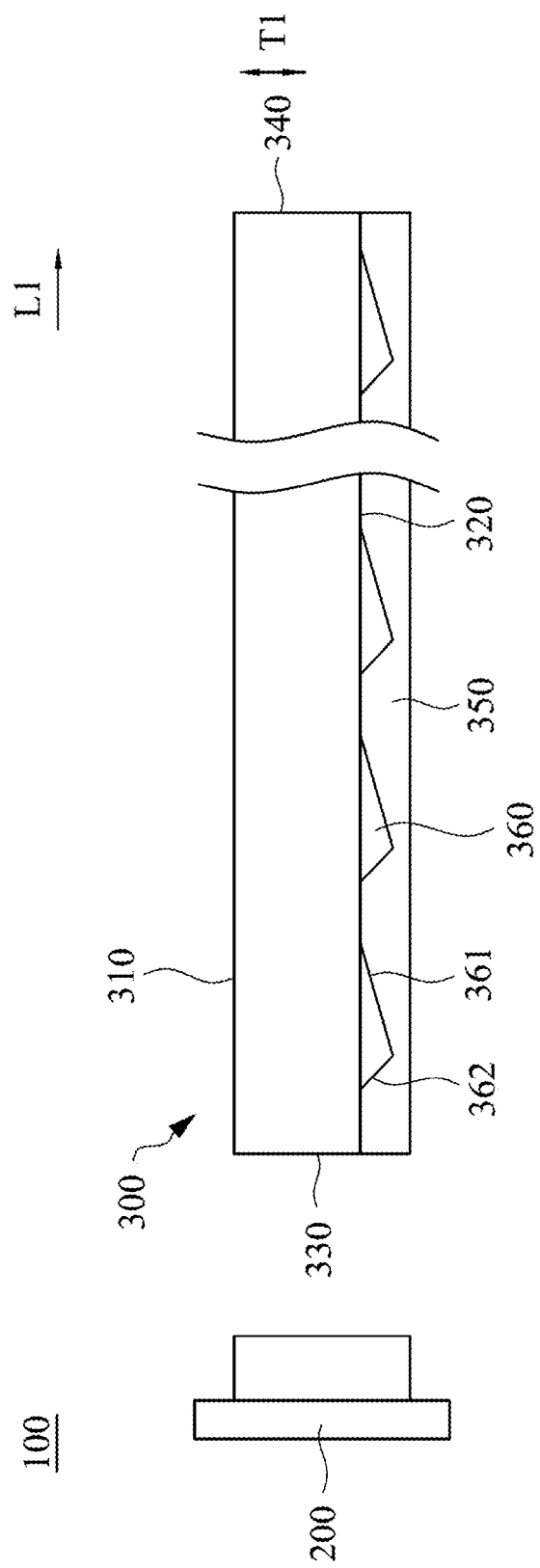
FIG. 1 illustrates a schematic diagram of a backlight module in accordance with a first embodiment of the present disclosure.
Figure 2:
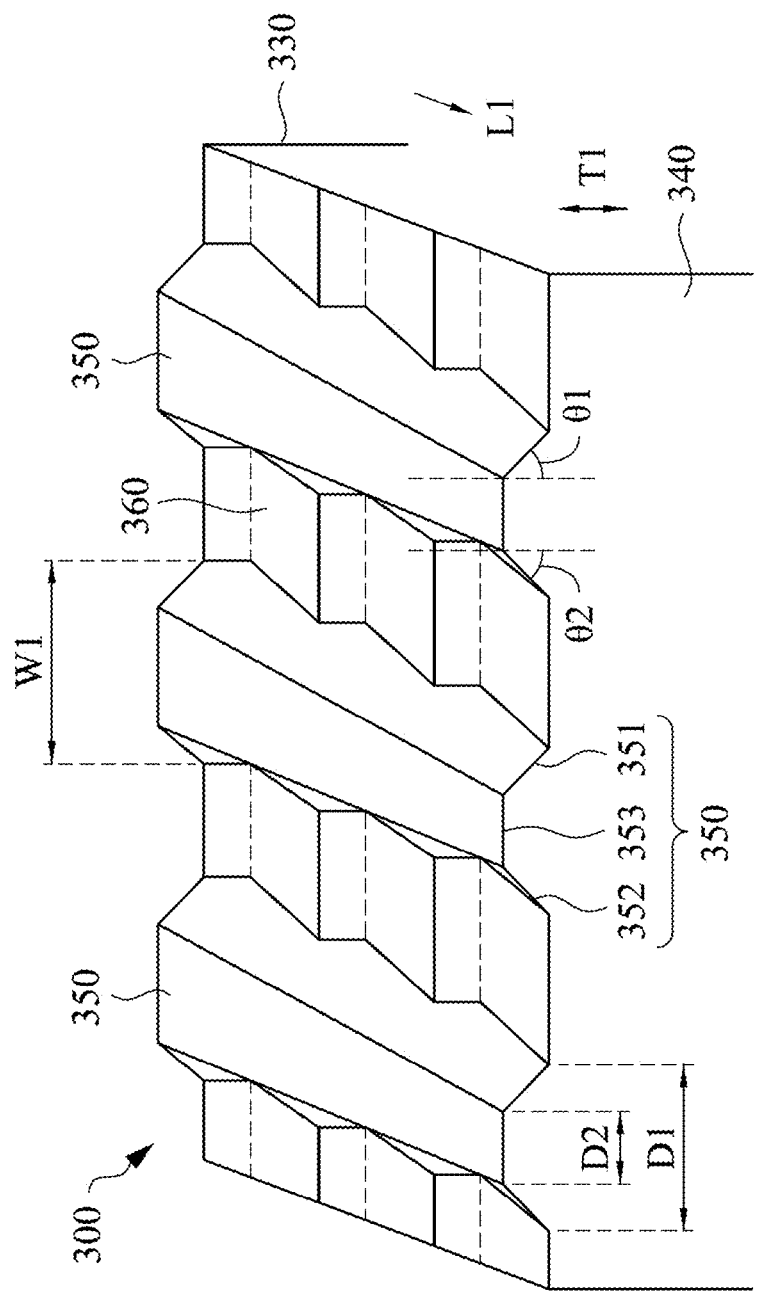
FIG. 2 illustrates a schematic structural diagram of a light guide plate in accordance with the first embodiment of the present disclosure.

Referring to FIG. 1 and FIG. 2, in which FIG. 1 illustrates a schematic diagram of a backlight module in accordance with a first embodiment of the present disclosure, and FIG. 2 illustrates a schematic structural diagram of a light guide plate in accordance with the first embodiment of the present disclosure. A backlight module 100 of the present disclosure mainly includes a light source 200 and a light guide plate 300. The light source 200 is configured to provide light into the light guide plate 300. The light guide plate 300 includes a light-emitting surface 310, a bottom surface 320, a light-incident surface 330, an opposite light-incident surface 340, plural stripe-shaped microstructures 350, and plural light-guiding microstructures 360. The opposite light-incident surface 340 is opposite to the light-incident surface 330. The bottom surface 320 and the light-emitting surface 310 are respectively connected to two opposite sides of the light-incident surface 330. The light source 200 is adjacent to the light-incident surface 330, such that the light emitted by the light source 200 enters the light guide plate 300 through the light-incident surface 330.

In some embodiments, the stripe-shaped microstructures 350 may be disposed on at least one of the light-emitting surface 310 and the bottom surface 320. In the embodiment of FIG. 1 and FIG. 2, the stripe-shaped microstructures 350 are disposed on the bottom surface 320. In the present embodiment, the light guide plate 300 has a length direction L1 and a thickness direction T1, in which the length direction L1 is vertical to an extending direction of the light-incident surface 330, and the stripe-shaped microstructures 350 extend along the length direction L1 of the light guide plate 300. In some embodiments, one end of the stripe-shaped microstructure 350 is connected to the light-incident surface 330, and another end of the stripe-shaped microstructure 350 is connected to the opposite light-incident surface 340. In the present embodiment, the stripe-shaped microstructures 350 are arranged discontinuously along an extending direction of the light-incident surface 330.

In the present embodiment, each of the stripe-shaped microstructures 350 has two side surfaces (for example, a side surface 351 and a side surface 352) opposite to each other and an active surface 353. The side surface 351 and the side surface 352 are respectively connected to two opposite sides of the active surface 353. Specifically, a cross-section of each of the stripe-shaped microstructures 350 is a trapezoid, and the active surface 353 is a plane. In other words, when the stripe-shaped microstructures 350 are disposed on the light-emitting surface 310, the active surfaces 353 are parallel to the light-emitting surface 310; and when the stripe-shaped microstructures 350 are disposed on the bottom surface 320, the active surfaces 353 are parallel to the bottom surface 320. The side surface 351 and the side surface 352 are inclined relative to the active surface 353, and the side surface 351 and the side surface 352 respectively have an included angle θ1 and an included angle θ2 with the thickness direction T1. In the present embodiment, the included angle θ1 and the included angle θ2 are mainly used to determine of inclination degrees of the side surface 351 and the side surface 352 relative to the active surface 353. In the present embodiment, the function of the stripe-shaped microstructures 350 is that the side surface 351 and the side surface 352 are used to change a travel direction of the light in the light guide plate 300 when the light is reflected back and forth between the light-emitting surface 310 and the bottom surface 320 due to the total reflection principle. With the design of the active surfaces 353, an emitted angle of the light emitted from the light guide plate 300 can be controlled to achieve the purpose of adjusting an emitted view angle of the light. Furthermore, the designs of the side surfaces 351, 352 and the active surface 353 of the stripe-shaped microstructure 350 of the present disclosure is easier to control in mold processing. Specifically, using the way that the side surface 351 and the side surface 352 are designed as inclined surfaces and are inclined relative to the active surface 353, it is easier to control the included angle θ1 and the included angle θ2 while processing to determine slopes of the side surface 351 and the side surface 352. If the stripe-shaped microstructure is changed to an arc stripe-shaped structure with a semicircular cross-section, a surface of an arc itself has a variation in curvature, so that an emitting direction of the light is not easy to control. If the stripe-shaped microstructure is changed to a V-shaped structure with an inverted triangular cross section, the light easily enters from one side surface of a triangle to another side surface, which results in that the light is refracted and reflected many times, and the emitting direction of the light cannot be controlled.

Figure 3:
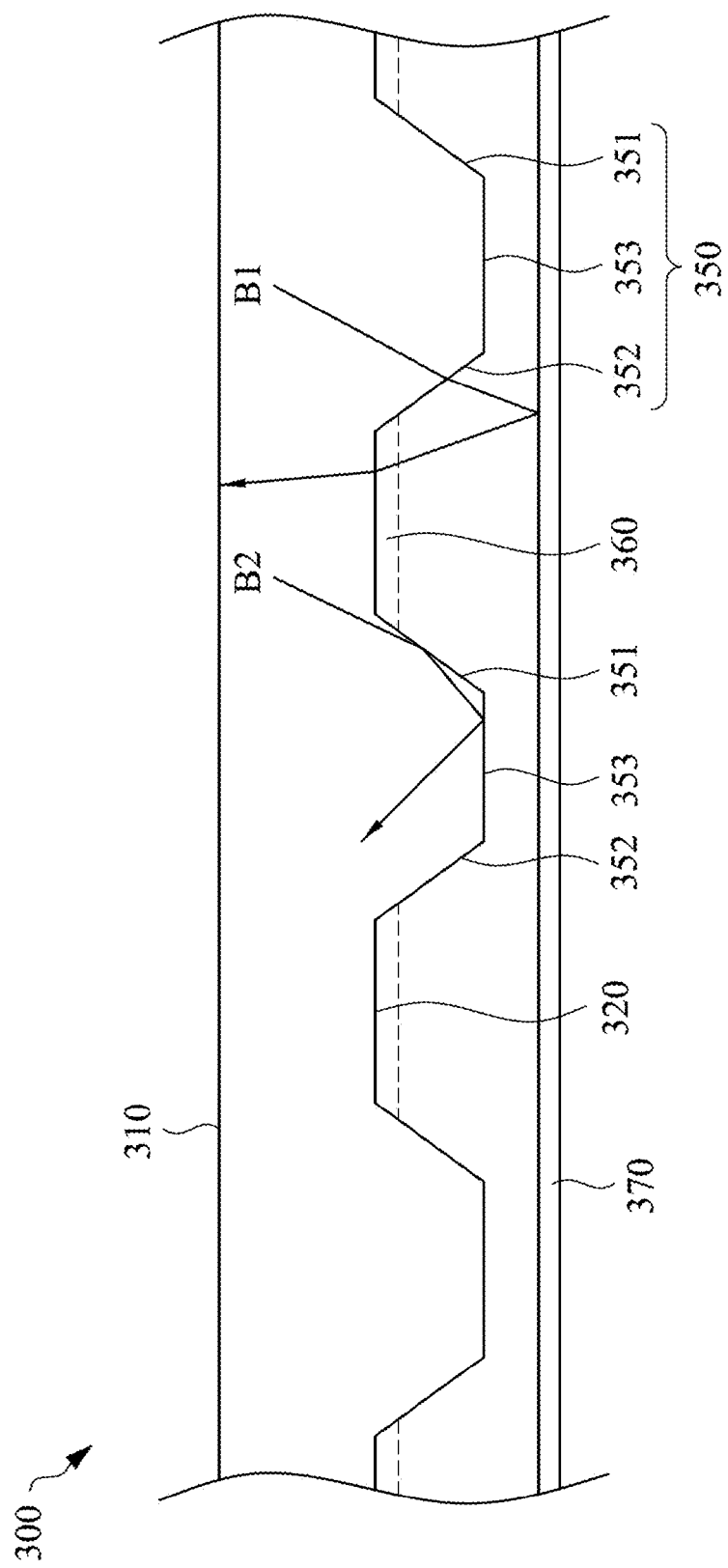
FIG. 3 illustrates a schematic partial cross-sectional view of the light guide plate in accordance with the first embodiment of the present disclosure.

Specifically, referring to FIG. 3, FIG. 3 illustrates a schematic partial cross-sectional view of the light guide plate in accordance with the first embodiment of the present disclosure. When the light B1 is emitted to the side surface 352 of the stripe-shaped microstructure 350, the light B1 first interacts with the side surface 352 to exit the light guide plate 300, and is further reflected by a reflective sheet 370 disposed on a bottom of the light guide plate 300 to enter the light guide plate 300 again, and the light entering the light guide plate 300 again will be emitted in a direction inclining toward a normal direction of the light-emitting surface 310 of the light guide plate 300 so as to achieve the purpose of converging a light-emitting view angle. When the light B2 is emitted to the side surface 351 of the stripe-shaped microstructure 350, since the side surface 351 and the side surface 352 of the stripe-shaped microstructure 350 are separated by the active surface 353 and are not directly connected to each other, the light B2 reflected by the side surface 351 will not be emitted from the side surface 352, but will be reflected by the active surface 353 and be emitted from the light-emitting surface 310 of the light guide plate 300. Through the design of the slopes of the side surface 351 and the side surface 352 are fixed values without any variation in curvature, the light B1 and the light B2 are reflected and refracted by the inclined surfaces with fixed slopes and move toward the active surface 353 or the reflective sheet 370, such that the purpose of adjusting the light-emitting direction of the light can be achieved, and left and right view angles can be effectively converged to reduce the noise. Compared with the arc surface with changing curvature, the reflection or the refraction of the light is hard to control, the light is easy to be diverged towards left or right when the light is emitted, and thus resulting in a disadvantage of uncontrollable view angle. If viewing from the V-shaped stripe structure of the inverted triangular, since the V-shaped stripe structure of the inverted triangular lacks the active surface 353 parallel to the light-emitting surface 310 or the bottom surface 320, a larger proportion of the light is refracted by the inclined surface with a fixed slope, leaves the light guide plate to enter the air layer, and is further reflected by the reflective sheet. Due to traveling between the different medium, the light is prone to have a disadvantage of energy consumption.

In an embodiment, referring to FIG. 1 and FIG. 2 simultaneously, a distance D1 between edges of the side surface 351 and the side surface 352 of each stripe-shaped microstructure 350 which are not connected to the active surface 353 is greater than a width D2 of the active surface 353. This design mainly responses to the fact that an occurrence probability of the light B2 is smaller than an occurrence probability of the light B1. Therefore, the width D2 of the active surface 353 is reduced to increase the occurrence probability of the light B1, which effectively converges the left and right view angles and lowers the noise.

Continue to refer to FIG. 1 and FIG. 2, the light guiding microstructures 360 are disposed between any adjacent two of the stripe-shaped microstructures 350, and the light guiding microstructures 360 are arranged along an extending direction (that is, the length direction L1 of the light guide plate 300) of the stripe-shaped microstructures 350. A function of the light guiding microstructures 360 is that when the light moves along a direction from the light-incident surface 330 to the opposite light-incident surface 340 in the light guide plate 300, the light can be emitted from the light guide plate 300 to enhance a light-emitting ratio by using a concave-convex design to reduce a planer ratio so as to breach the principle of total internal reflection. In the present embodiment, each light guiding microstructure 360 is an asymmetrical triangular structure in a cross section view, and includes a light-facing surface 361 and an opposite light-facing 362 connected to each other. The light-facing surface 361 is a surface facing the light source 200 (that is, a direct light-receiving surface), and the opposite light-facing 362 is a surface opposite to the light-facing surface 361 and turning its back to the light source 200. In the present embodiment, the inclination degree of the light-facing surface 361 is smaller than the inclination degree of the opposite light-facing 362, and in the structural design, an area of the light-facing surface 361 is greater than an area of the opposite light-facing surface 362, so as to increase the reflection of the light, thereby enhancing use efficiency of the light. In an embodiment, an arrangement density of the light-guiding microstructures 360 depends on a refractive index of the light guide plate 300. Specifically, the arrangement density of the light guiding microstructures 360 is an increasing function of the refractive index of the light guide plate 300. The greater the refractive index of the light guide plate 300 means that the light guide plate 300 is an optically dense medium and is difficult to emit light, so the arrangement density of the light guiding microstructures 360 is greater, a concave-convex degree is higher, and a planer ratio is lower to increase a light-emitting ratio.

Referring to FIG. 2 again, in an embodiment, a width of each of the stripe-shaped microstructures 350 gradually decreases from one end close to the light-incident surface 330 to the other end close to the opposite light-incident surface 340. That is, an area ratio of the stripe-shaped microstructures 350 close to the light-incident surface 330 is higher than an area ratio of the stripe-shaped microstructures 350 far from the light-incident surface 330. Relatively, an area ratio of the light-guiding microstructures 360, which is disposed between the adjacent stripe-shaped microstructures 350 to increase the light-emitting ratio, far from the light-incident surface 330 is greater than that close to the light-incident surface 330, so as to increase the light-emitting amount of the light guide plate 300 at a position away from the light-incident surface 330.

Figure 4:
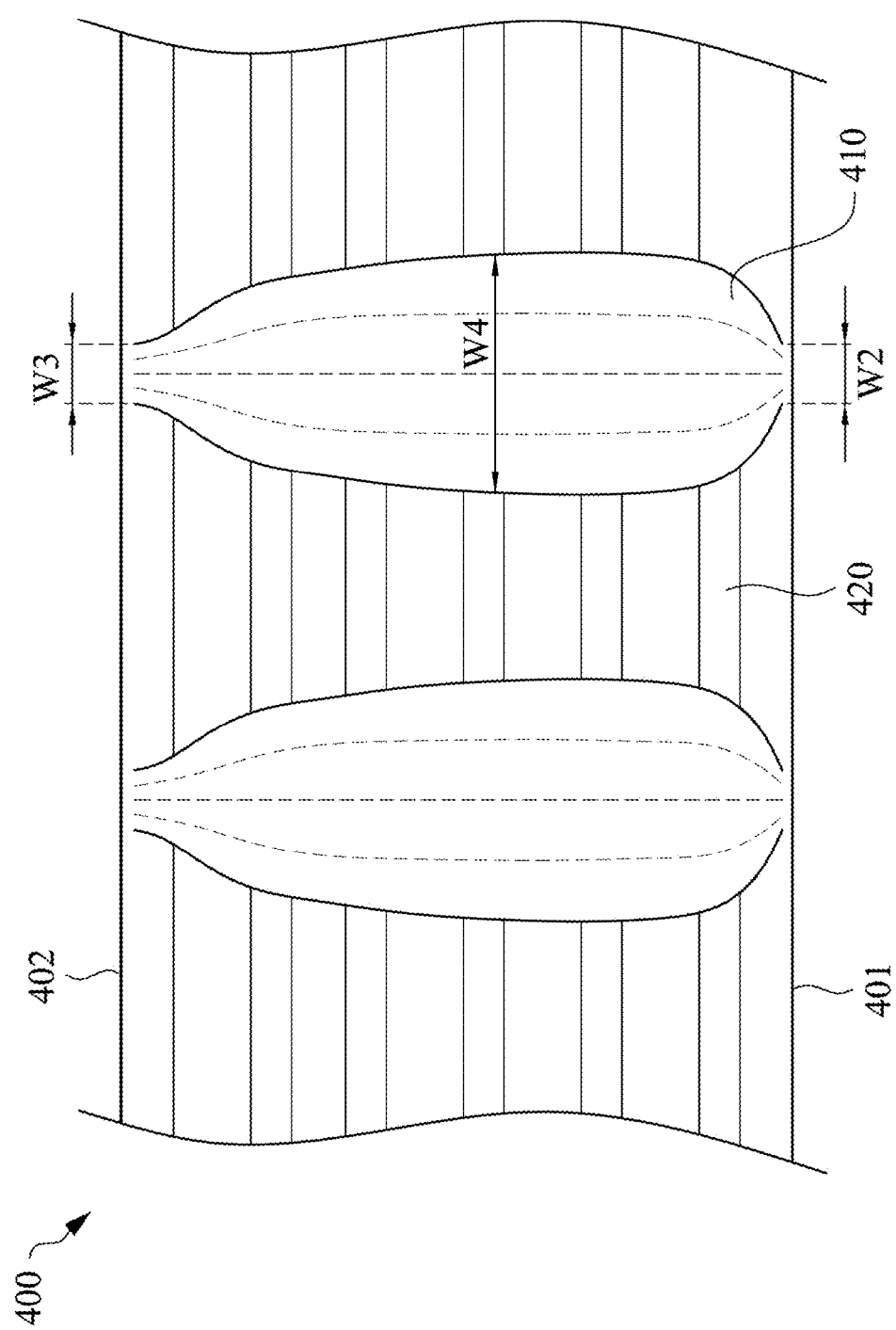
FIG. 4 illustrates a partial top view of a light guide plate in accordance with a second embodiment of the present disclosure.

In the aforementioned embodiment, the stripe-shaped microstructures may also have different structural designs. Referring to FIG. 4, FIG. 4 illustrates a partial top view of a light guide plate in accordance with a second embodiment of the present disclosure. A structure of a light guide plate 400 of the embodiment in FIG. 4 is substantially the same as that of the light guide plate 300 shown in FIG. 1 to FIG. 3, the difference is only that stripe-shaped microstructures 410 of the light guide plate 400 have different width variations. As shown in FIG. 4, the light guide plate 400 includes plural stripe-shaped microstructures 410 and plural light-guiding microstructures 420 disposed on a bottom surface (reflective surface) or a light-emitting surface of the light guide plate 400, and the light-guiding microstructures 420 are disposed between any adjacent two of the light guiding microstructures 420. Furthermore, in FIG. 4, solid lines of each stripe-shaped microstructure 410 are entire contour, and middle dotted lines are paths of cutting tool while making molds of the stripe-shaped microstructures 410. In the present embodiment, the structural design principles and the functions of stripe-shaped microstructures 410 and the light-guiding microstructures 420 are the same as those of stripe-shaped microstructures 350 and the light-guiding microstructures 360 in FIG. 1 and FIG. 3, so it is not repeated here. In the present embodiment, a first portion of the stripe-shaped microstructure 410 close to a light-incident surface 401 has a width W2, a second portion of the stripe-shaped microstructure 410 close to an opposite light-incident surface 402 has a width W3, a portion of the stripe-shaped microstructure 410 between the first portion and the second portion is defined as a third portion, and the third portion has a width W4. The width W4 is greater than the width W2, and the width W2 is greater than the width W3. Therefore, through the width variation of the stripe-shaped microstructure 410, the stripe-shaped microstructure 410 occupies different areas in the light guide plate 400 close to the light-incident surface 401 of the light guide plate 400, far from the light-incident surface 401 of the light guide plate 400 (that is, the opposite light-incident surface 402), and a middle portion of the light guide plate 400 respectively, such that the light-emitting amount at different locations of the light guide plate 400 can be controlled respectively, thereby improving the light-emitting uniformity of the entire light guide plate 400. On the one hand, the width W2 close to the light-incident surface 401 is the smallest (smaller than the width W3 and the width W4), and the width ratio of the light guiding microstructure 420 at the light-incident surface is the largest, so the problem that bright bands and dark bands are easily generated at the light-incident surface in the prior art can be solved. On the other hand, an area ratio of the stripe-shaped microstructure 410 close to the light-incident surface 401 is higher than an area ratio of the portion far from the light-incident surface 401. Relatively, the light-guiding microstructure 420 used to increase light-emitting ratio has a higher area ratio on the portion far from the light-incident surface 401 (i.e. the second portion) is higher than an area ratio on the portion close to the light-incident surface 401 (i.e. the third portion), hence the light-emitting amount of the light guide plate 400 far from the light-incident surface 401 can be increased.

Figure 5:
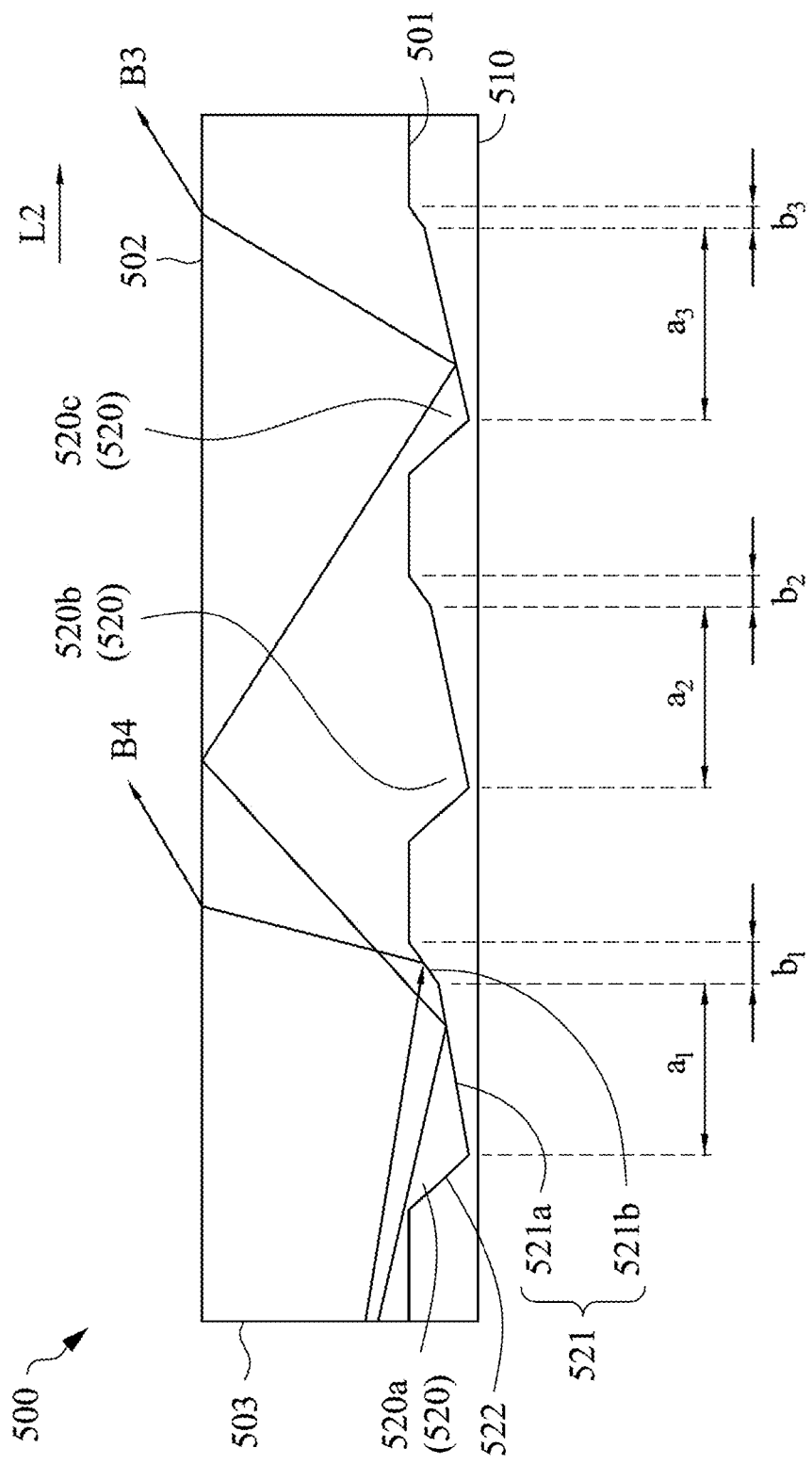
FIG. 5 illustrates a side view of a light guide plate in accordance with a third embodiment of the present disclosure.

The light-guiding structure of the present disclosure can also have different structural designs. Referring to FIG. 5, FIG. 5 illustrates a side view of a light guide plate in accordance with a third embodiment in accordance with the present disclosure. A structure of a light guide plate 500 of the embodiment in FIG. 5 is substantially the same as the light guide plate 300 shown in FIG. 1 to FIG. 3, the only difference is that light guiding microstructures 520 of the light guide plate 500 have a different structural design. As shown in FIG. 5, the light guide plate 500 mainly includes plural stripe-shaped microstructures 510 and plural light-guiding microstructures 520, the stripe-shaped microstructures 510 and the light-guiding microstructures 520 are disposed on the bottom surface 501, and the light-guiding microstructures 520 are disposed between any adjacent two of the stripe-shaped microstructures 510. The structural design principles and the functions of the stripe-shaped microstructures 510 are the same as those of the aforementioned stripe-shaped microstructures 350, hence it is not be repeated here. In the present embodiment, the light-guiding microstructure 520 includes a light-facing surface 521 and an opposite light-facing surface 522 connected to each other, in which the light-facing surface 521 includes a first reflective surface 521a and a second reflective surface 521b connected to each other. The first reflective surface 521a is connected to the opposite light-facing surface 522, and an inclination degree of the first reflective surface 521a is smaller than an inclination degree of the second reflective surface 521b.

As shown in FIG. 5, the inclination degree of the first reflective surface 521a is smaller, such that light B3 needs to be reflected more times before it can be emitted from a light-emitting surface 502 of the light guide plate 500. The inclination degree of the second reflective surface 521b is larger, such that light B4 can be emitted from the light-emitting surface 502 of the light guide plate 500 with fewer reflections. From this, it can be seen that after the light is reflected by the first reflective surface 521a and the second reflective surface 521b with different inclination degrees, the light with a longer light path (for example, the light B3) and the light with a shorter light path (for example, the light B4) can be generated. Therefore, part of the light can be emitted out in advance, while another part of the light keeps moving toward the opposite light-facing surface 522.

In some embodiments, light-emitting locations, light-emitting angles, and light distribution ratio of light with the longer light path and the light with the shorter light path can be further controlled and adjusted by adjusting the inclination degrees and/or the lengths of the first reflective surface 521a and the second reflective surface 521b, so as to satisfy a specification required for subsequent display panels in various application levels. Specifically, as shown in FIG. 5, the light guide plate 500 is defined to have a length direction L2, and the length direction L2 is perpendicular to an extending direction of a light-incident surface 503 of the light guide plate 500. For the sake of clear elucidating, the light-guiding microstructures 520 are separately labeled along the length L2, that is, the light-guiding microstructures 520 are sequentially labeled as a light-guiding microstructure 520a, a light-guiding microstructure 520b, and a light-guiding microstructure 520c. The first reflective surface 521a and the second surface 521b of the light-guiding microstructure 520a have a projection length a1 and a projection length b1 respectively in the length direction L2, and a ratio of the projection length b1 to the projection length a1 is P1. Similarly, the first reflective surface 521a and the second surface 521b of the light-guiding microstructure 520b are respectively have a projection length a2 and a projection length b2, and a ratio of the projection length b2 to the projection length a2 is P2. The first reflective surface 521a and the second surface 521b of the light guiding microstructure 520c respectively have a projection length a3 and a projection length b3, and a ratio of the projection length b3 to the projection length a3 is P3.

In the present embodiment, the ratio P3 of the light-guiding microstructure 520c far from the light-incident surface 503 is smaller than the ratio P2 of the light-guiding microstructure 520b close to the light-incident surface 503. That is, the projection lengths of the first reflective surfaces 521a of the light-guiding microstructure 520a, the light-guiding microstructure 520b and the light-guiding microstructure 520c in the length direction L2 are gradually increased as they are away from the light-incident surface 503, and the projection lengths of the second reflective surfaces 521b of the light-guiding microstructure 520a, the light-guiding microstructure 520b and the light-guiding microstructure 520c on the length direction L2 are gradually reduced as they are close to the light-incident surface 503, such that P1>P2>P3. Specifically, the projection length a1 of the first reflective surface 521a of the light-guiding microstructure 520a close to the light-incident surface 503 in the length direction L2 is shorter and the first reflective surface 521a has a smaller area, such that it can reduce the proportion of total reflection and the light with a long light path. The projection length b1 of the second reflective surface 521b of the light-guiding microstructure 520a close to the light-incident surface 503 in the length direction L2 is longer and the second reflective surface 521b has a larger area, such that it can increase the proportion of light transmitted from here in the light guide plate 500, and the light with a short light path. Accordingly, a higher proportion of light with a short light path can be provided in an area close to the light-incident surface 503, which further improves the situation of the occurrence of dark bands in the area close to the light-incident surface 503. On the other hand, since it does not need to use light with a short light path to improve dark bands at a location of the light guide plate 500 far from the light-incident surface 503, the light-guiding microstructures 520 can be designed to mainly generate the light with a long light path. Thus, the second reflective surface 521b of the light-guiding microstructure 520c is form to have a shorter projection length b3 and a smaller area, and the first reflective surface 521a of the light-guiding microstructure 520 is formed to have a longer projection length a3 and a larger area, to meet a light-emitting requirement of a location in the light guide plate 500 far from the light-incident surface 503.

In the embodiment of FIG. 5, the ratio P1, the ratio P2, and the ratio P3 of the light-guiding microstructure 520a, the light-guiding microstructure 520b, and the light-guiding microstructure 520c can also be designed to be equal according to the requirement. Thereby, a distribution proportion of the light with a long light path and the light with a short light path along the length direction L2 is fixed, such that the mold of the light guide plate 500 is easy to fabricate, which is beneficial to lower production cost.

Figure 6:
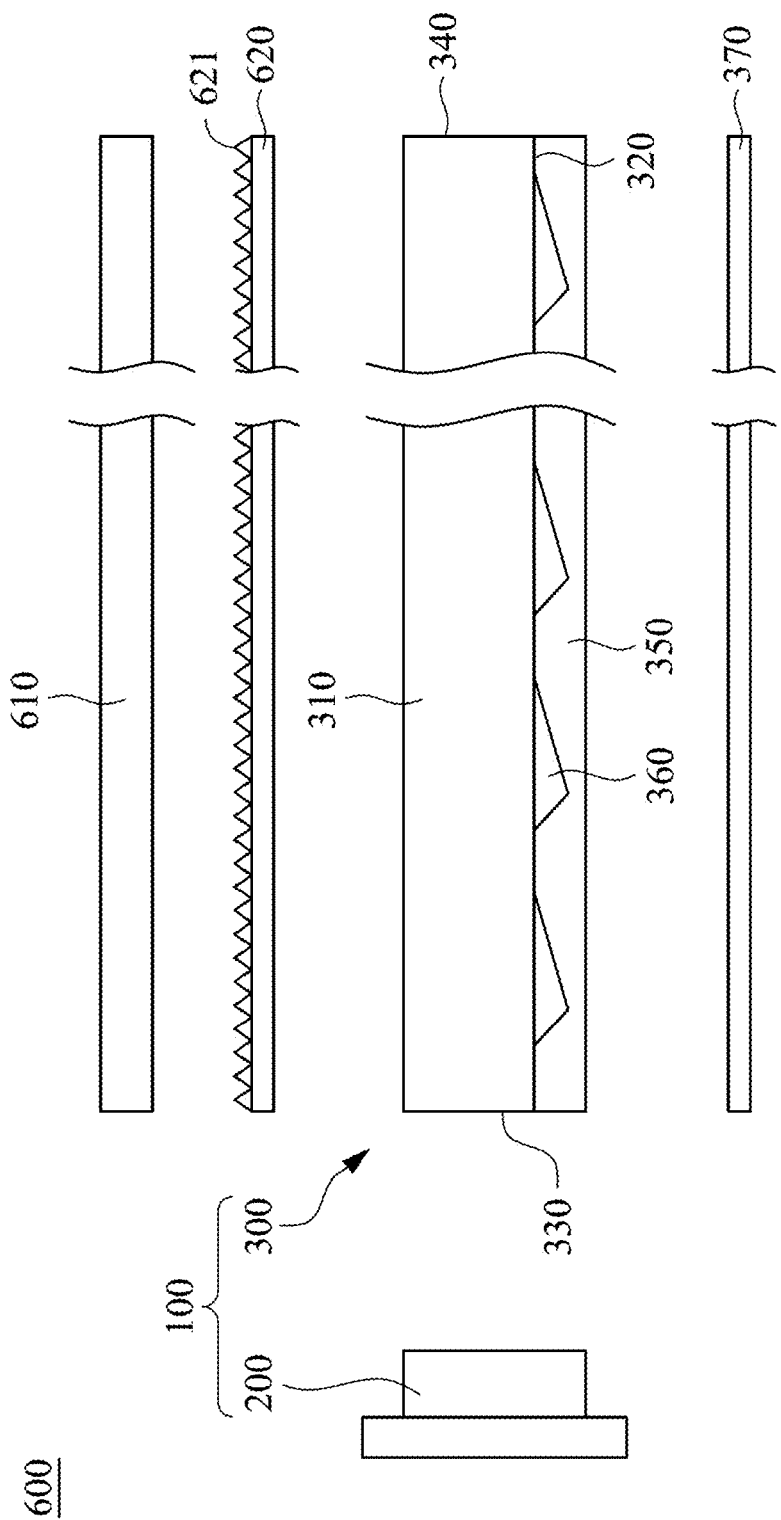
FIG. 6 illustrates a schematic diagram of a display device in accordance with an embodiment of the present disclosure.

Referring to FIG. 6, FIG. 6 illustrates a schematic diagram of a display device in accordance with an embodiment of the present disclosure. A display device 600 of the present embodiment includes the backlight module 100 as shown in FIG. 1, a display panel 610, at least one film 620, and the reflective sheet 370. As shown in FIG. 6, the film 620 is disposed in front (light-emitting side) of the light guide plate 300 of the backlight module 100, the reflective sheet 370 is disposed behind the light guide plate 300 of the backlight module 100, and the display panel 610 is disposed at a light-emitting side of the film 620. The film 620 can be a prism sheet disposed on the light guide plate 300, wherein the prism sheet comprises a plurality of prism structures 621, and an extending direction of each of the prism structures 621 is parallel to the light-incident surface 330. Through the way that extending direction of prism structures 621 are parallel to the light-incident surface 330 of the light guide plate 300, the light leaving from the light guide plate 300 can converge and increase luminance in the normal direction of the light guide plate 300 in order to provide the display panel 610 with light. Therefore, through the design of the stripe-shaped microstructures 350 and the light-guiding microstructures 360 on the light guide plate 300, the display device 600 can also adjust a traveling direction and a light-emitting direction of light, thereby achieving the objective of controlling a light-emitting view angle. In the embodiment of the present application, the backlight module 100 shown in FIG. 1 is applied in the display device 600 only for exemplary illustration, and is not intended to limit the present invention. The light guide plates (for example, the light guide plate 400 or the light guide plate 500) of the other aforementioned embodiments can all be applied to display devices to achieve the same effect.

From the aforementioned embodiments, it can be known that the present disclosure changes the path of light in the light guide plate through the stripe-shaped microstructure having the double side surfaces and the active surface, and adjusts a light-emitting location of and a light-emitting amount with the light-guiding microstructures, such that the objective of adjusting a light-emitting view angle and improving an overall light-emitting uniformity can be achieved.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. A light guide plate configured to be coupled with a light source, wherein the light guide plate comprises:
   a light-emitting surface;
   a bottom surface opposite to the light-emitting surface;
   a light-incident surface connected between the light-emitting surface and the bottom surface, and light emitted by the light source entering the light guide plate through the light-incident surface;
   a plurality of stripe-shaped microstructures disposed on at least one of the light-emitting surface and the bottom surface; and
   a plurality of light-guiding microstructures disposed between any adjacent two of the stripe-shaped microstructures and arranged along an extending direction of each of the stripe-shaped microstructures;
   wherein each of the light-guiding microstructures comprises a light-facing surface and an opposite light-facing surface interconnected to each other, and an inclination degree of the light-facing surface is smaller than an inclination degree of the opposite light-facing surface;
   wherein the light-facing surface comprises a first reflective surface and a second reflective surface connected to each other, an inclination degree of the first reflective surface is smaller than an inclination degree of the second reflective surface, and one of the first reflective surface and the second reflective surface is connected to the opposite light-facing surface;
   wherein the light guide plate comprises an opposite light-incident surface opposite to the light-incident surface;
   each of the stripe-shaped microstructures comprises a first portion, a second portion, and a third portion, wherein the first portion has a first width and is close to the light-incident surface, the second portion has a second width and is close to the opposite light-incident surface, and the third portion is between the first portion and the second portion and has a third width; and
   the third width is larger than the first width, and the first width is larger than the second width.

2. The light guide plate of claim 1, wherein each of the stripe-shaped microstructures has two opposite side surfaces and an active surface, wherein the side surfaces are connected to two opposite sides of the active surface, wherein the light guide plate has a thickness direction, the side surfaces are inclined toward the active surface, and there is an included angle formed between each of the side surfaces and the thickness direction.

3. The light guide plate of claim 2, wherein a distance between edges of the side surfaces of each of the stripe-shaped microstructures not connected to the active surface is larger than a width of the active surface.

4. The light guide plate of claim 1, wherein the light guide plate has a length direction, the length direction is perpendicular to the light-incident surface, wherein each of the light-guiding microstructures has a ratio, the ratio is a projection length of the second reflective surface in the length direction divided by a projection length of the first reflective surface in the length direction, and the ratio of the light-guiding microstructure far from the light-incident surface is smaller than the ratio of the light-guiding microstructure adjacent to the light-incident surface.

5. A backlight module, comprising:
   the light guide plate of claim 1; and
   a light source adjacent to the light-incident surface.

6. The backlight module of claim 5, further comprising at least one prism sheet disposed on the light guide plate, wherein the prism sheet comprises a plurality of prism structures, and an extending direction of each of the prism structures is parallel to the light-incident surface.

7. A display device, comprising:
the backlight module of claim 5; and
a display panel disposed on the backlight module.

8. The light guide plate of claim 1, wherein for each of the light-guiding microstructures:
the light-facing surface is closest to the light-incident surface, the second reflective surface is farthest from the light-incident surface, and the first reflective surface is disposed between the light-facing surface and the second reflective surface; and
the light guide plate has a length direction, the first and second reflective surfaces of the light-facing surface respectively has first and second projection lengths along the length direction of the light guide plate, and the first projection length of the first reflective surface is greater than the second projection length of the second reflective surface.

9. The light guide plate of claim 8, wherein for each of the light-guiding microstructures:
the first reflective surface is connected to the opposite light-facing surface;
lines extending internally of the light guide plate and normal respectively to the first and second reflective surfaces of the light-facing surface are slanted toward the light-incident surface; and
a line extending internally of the light guide plate and normal to the opposite light-facing surface is slanted away from the light-incident surface.

10. The light guide plate of claim 8, wherein, for all of the light-guiding microstructures arranged along the extending direction of each of the stripe-shaped microstructures, the projection lengths of the first reflective surfaces increase from one of the light-guiding microstructures to the next as a distance from the light-incident surface is increased, and the projection lengths of the second reflective surfaces decrease from one of the light-guiding microstructures to the next as the distance from the light-incident surface is increased.

* * * * *